Aug. 7, 1956  R. M. ULRICH  2,757,684
SEPARABLE COUPLING
Filed Jan. 21, 1954
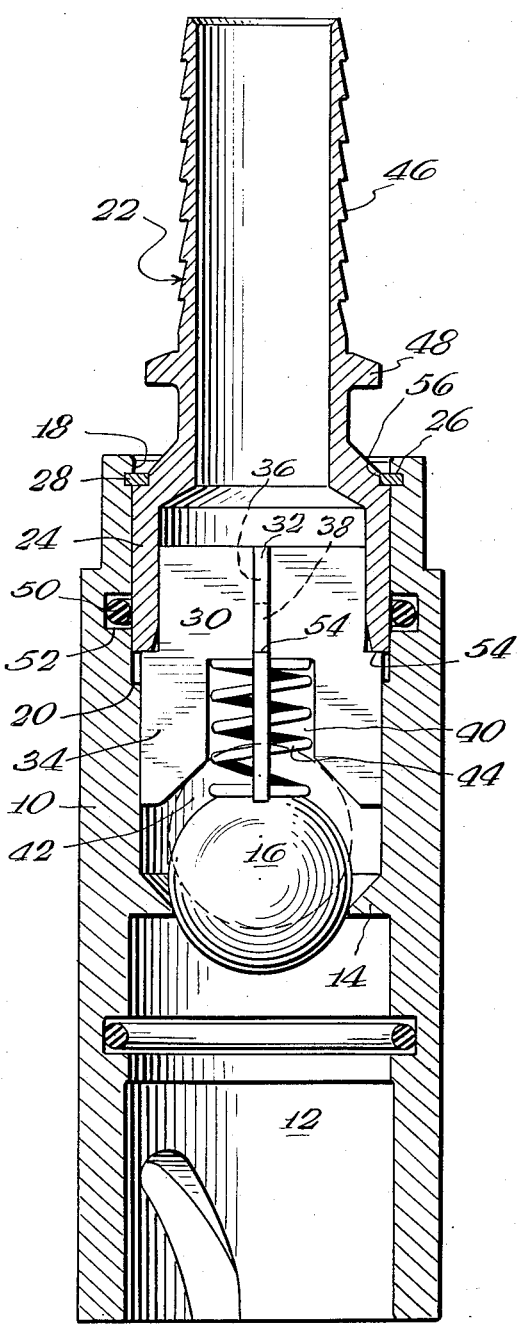
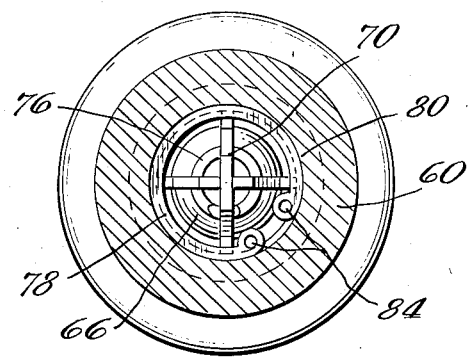
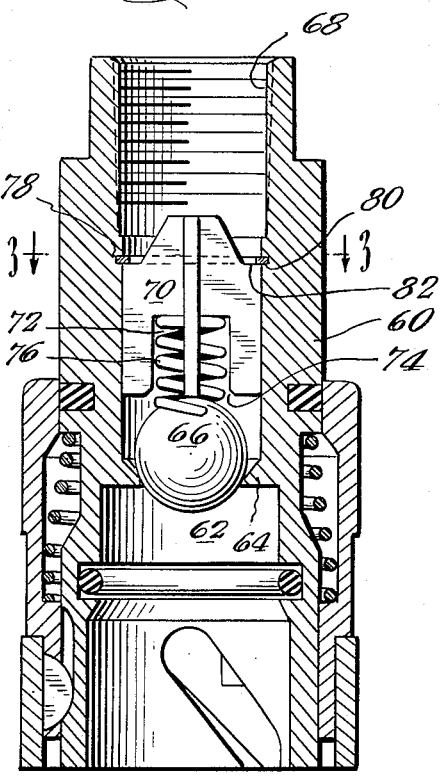
Inventor
Raymond M. Ulrich
By Alvin W. Graf
Attorney

United States Patent Office 2,757,684
Patented Aug. 7, 1956

2,757,684

SEPARABLE COUPLING

Raymond M. Ulrich, Roanoke, Ill., assignor to Ulrich Foundation, Inc., a corporation of Delaware Application January 21, 1954, Serial No. 405,441

3 Claims. (Cl. 137—515)

The present invention relates to separable couplings for fluid conduits.

One form of separable coupling known to the art utilizes a valve seat and a closure ball to seal each of the two coupling members when they are disengaged. When the two members are engaged, the closure balls of the members contact each other and exert pressure upon each other, thereby forcing each of the closure balls away from the valve seats and opening the passage through the two members. However, since the closure balls remain within the passages in the members, they tend to introduce turbulence into the flow of fluid through the separable coupling and reduce its capacity. It is therefore an object of the present invention to provide a separable coupling for fluid conduits having a coupling member using a valve seat and a closure ball which minimizes the turbulence in the flow of fluid through the separable coupling.

The turbulence in the flow of fluid through separable couplings of this type can be minimized by confining the position of the closure balls to the axis of the passages through the coupling members. It is thus a further object of the present invention to provide a separable fluid coupling utilizing a valve seat and closure ball in the passage through a coupling member in which the closure ball is confined to the axis of the passage.

Separable coupling members are generally attached to a hose for conveying fluid in one of two different ways. If the hose is to be frequently disconnected from the coupling member, both the coupling member and the hose are provided with threaded fittings. However, if the hose is not intended to be frequently disconnected from the coupling member, the coupling member is provided with a ridged hose coupler which is rammed into the hose and may not be removed without damaging the hose. Often the process of ramming the hose onto the hose coupler injures the coupling member. It is a further object of the present invention to provide a separable coupling with a coupling member utilizing a valve seat, closure ball, and means to confine the closure ball to the axis of the passage through the coupling member in which the ball confining means prevents the hose coupler from being removed from the coupling member when the members of the separable coupling are engaged, and permits the removal of the hose coupler when the members of the separable coupling are disengaged.

Other objects and advantages of the present invention will become readily apparent to the man skilled in the art from a further reading of the present specification and claims, particularly when viewed in the light of the drawings. It is to be noted that the drawings illustrate only female coupling members, since the construction of male and female coupling members is well known to the art and has no direct relation to the present invention. The drawings are as follows:

Figure 1 if a vertical sectional view of a coupling member of a separable coupling constructed according to the teachings of the present invention;

Figure 2 is a vertical sectional view of another coupling member which constitutes a second embodiment of the invention; and Figure 3 is a horizontal sectional view taken along line 3—3 of Figure 2.

As illustrated in Figure 1, the coupling member of a separable coupling has a housing 10 having a passage 12 extending longitudinally therethrough. An annular valve seat 14 is formed by a ridge extending into the passage 12 from the surface of the housing 10. A closure ball 16, having a diameter slightly larger than the diameter of the valve seat 14, is disposed within the passage 12 and confronts the valve seat 14.

The diameter of the mouth 18 of the passage 12 exceeds the diameter of the passage 12 in the region between the valve seat 14 and the mouth 18, thus providing the housing 10 with a shoulder 20. A hose coupler 22 is provided with a hollow cylindrical end portion 24 which is slidably disposed within the mouth 18 of the passage 12, the end portion 24 of the hose coupler 22 being shorter than the mouth 18 of the passage 12. A groove 26 is disposed adjacent to the open end of the mouth 18, and a retaining band 28 is disposed within the groove 26. The end portion 24 of the hose coupler 22 is provided with a recess 56 which abuts the retaining band 28, when the hose coupler 22 is a maximum distance from the valve seat 14, the combined depth of the recess 56 and the groove 26 being barely sufficient to contain the retaining band 28.

An elongated X-shaped element 30 is disposed between the end portion 24 of the hose coupler 22 and the closure ball 16. This element 30 is formed by two plates 32 and 34. Plate 32 has a slot 36 extending therein along the axis of the passage 12 from the end adjacent to the mouth 18 of the passage 12, and the plate 34 has a slot 38 extending therein along the axis of the passage 12 from the opposite direction. Hence, plate 32 is disposed in the slot 38 of plate 34, and plate 34 is disposed in the slot 36 of plate 32. Also, the X-shaped element 30 is provided with an axial recess 40 confronting the closure ball 16, the plates 32 and 34 being tapered to provide the recess 40 with an outwardly flaring mouth 42. A helical spring 44 is disposed within the recess 40 along the axis of the passage 12 abutting the X-shaped element 30 and the closure ball 16. The plates 32 and 34 have smaller cross sections adjacent to the mouth 18 in order to permit the end portion 24 of the hose coupler 22 to slide between the housing 10 and the X-shaped element 30. Shoulders 54 are disposed at the point where the X-shaped element 30 achieves a diameter just smaller than that of the passage 12, and the end portion 24 of the hose coupler 22 abuts these shoulders 54.

The hose coupler 22 is provided with circumferential ridges 46 which are adapted to grip the interior surface of a hose. A flange 48 positioned between the ridges 46 and the end portion 24 limits the amount of hose that may be rammed upon the hose coupler 22.

A sealing ring 50 disposed within a channel 52 in the housing 10 adjacent to the end portion 24 of the hose coupler 22 prevents leakage of fluid from the passage 12 between the housing 10 and the end portion 24 of the hose coupler 22.

Figure 1 illustrates the "closed" position of the closure ball 16 in solid lines, and the "open" position of the closure ball 16 in dotted lines. It will be observed that in the closed position the closure ball 16 is forced against the valve seat 14 by the spring 44 exerting force against the housing 10 through the X-shaped element 30, the end portion 24 of the hose coupler 22, and the retaining band 28. In this position the end portion 24 of the hose coupler 22 is spaced from the shoulder 20 of the housing 10 but abuts the shoulders 54 of the X-shaped element 30; hence, the hose coupler 22 may be removed by forcing the end portion 24 of the hose coupler 22 against the shoulder 20 of the housing 10, removing the retaining band 28 from the groove 26, and withdrawing the hose coupler 22 from the housing 10.

However, when the coupling member is engaged with another coupling member of similar design, the closure ball 16 will be forced to maintain the open position shown in dotted lines in Figure 1, since it is retained in position by the outwardly flaring mouth 42 of the X-shaped element 30. As a result, the closure ball 16 is maintained on the axis of the pasage 12, and the closure ball 16 creates a minimum amount of turbulence in the flow of fluid passing through the separable coupling. Further, it is impossible for the hose coupler 22 to become disconnected from the housing 10 of the coupling member when the closure ball 16 is in this position, since the retaining band 28 is confined within the recess 56 in the hose coupler 22 and thus cannot be removed from the groove 26.

The embodiment of the invention shown in Figures 2 and 3 is designed for use with a hose provided with a threaded fitting. It has a housing 60 with a passage 62 provided with a valve seat 64 and a closure ball 66 confronting the valve seat 64, in a manner similar to that of the first embodiment. However, the mouth 68 of the passage 62 is provided with screw threads which are adapted to mesh with threads on the threaded fitting at the end of a hose. An X-shaped element 70 with a recess 72 having an outwardly flaring mouth 74 is disposed between the closure ball 66 and the threaded mouth 68 of the passage 62. A helical spring 76 is disposed between the closure ball 66 and the X-shaped element 70.

This embodiment of the invention differs from the first embodiment principally in that the X-shaped element 70 is directly anchored to the housing 60 by a retaining band 78 disposed in a groove 80 in the housing 60 adjacent to the mouth 68 of the passage 62. The X-shaped element 70 is inwardly flaring on the end confronting the mouth 68, thus forming shoulders 82. The shoulders 82 abut the retaining band 78. The retaining band 78 has a length slightly shorter than the circumference of the groove 80, and is provided with an aperture at each end to aid in its insertion and removal from the groove 80. As in the first embodiment, the closure ball 66 is forced against the X-shaped element 70 when the coupling member engages a similar coupling member to cause the closure ball 66 to move to the open position.

The man skilled in the art will readily devise many other devices and modifications of the present device within the scope of the present invention. Hence, it is intended that the present invention be not limited by the foregoing disclosure, but only as set forth by the following claims.

I claim:

1. A separable coupling member having a passage provided with a valve seat, a closure ball disposed within said passage confronting said valve seat, a pair of plates disposed within said passage adjacent said closure ball opposite to said valve seat, each of said plates having a slot extending centrally therein, said plates being disposed normal to each other with each plate disposed within the slot of the other plate to form an element with an X-shaped cross-section, said element being provided with an axial recess at one end having an outwardly flaring mouth, said plates at the other end of said element being provided with shoulders at the periphery of said element, means confining the translation of said X-shaped element in said passage and abutting said shoulders, a helical spring disposed between said X-shaped member and said closure ball, said passage of said member being provided with a transverse shoulder adjacent to said shoulders of said plates, and a transverse circular groove spaced axially from said shoulder on said passage, said means confining the translation of said X-shaped element comprising a hose coupler having a portion disposed exterior to said passage, said exterior portion being adapted to secure a hose, said portion within said passage conforming to the surface of said passage and having an inner end abutting said shoulders of said plates and disposed between said groove and said shoulder of said passage, and a retaining band disposed within said groove in said member.

2. In a separable hydraulic coupling having a passage provided with a valve seat, a closure ball for said seat, two similar complementary plates disposed normal to each other to form a stop member for said ball, said plates adjacent said ball having an outwardly flaring mouth and an axial recess, a spring positioned within said recess and engaging said ball, said stop member engaging adjacent said ball the sides of said passage, the combination of an enlarged passage portion at one end of said coupling forming a shoulder in said passage, an annular groove in said enlarged passage, a swivel connector fitted within said enlarged passage, a snap ring in said groove to retain said connector, said connector being axially movable a short distance to engage the shoulder of said passage, said stop member having a shoulder portion in engagement with the end of said connector.

3. In a separable hydraulic coupling having a passage provided with a valve seat, a closure ball for said seat, two similar complementary plates disposed normal to each other to form a stop member for said ball, a helical spring interposed between said ball and said stop member, said stop member engaging adjacent said ball the sides of said passage, the combination of an enlarged passage portion at one end of said coupling forming a shoulder in said passage, an annular groove in said enlarged passage, a swivel connector fitted within said enlarged passage, a snap ring in said groove to retain said connector, said connector being axially movable a short distance between said snap ring and the shoulder of said passage, said stop member having a shoulder portion in engagement with the end of said connector.

References Cited in the file of this patent

UNITED STATES PATENTS

| 2,481,713 | Bertea | Sept. 13, 1949 |
| 2,548,528 | Hansen | Apr. 10, 1951 |
| 2,614,866 | Ulrich | Oct. 21, 1952 |
| 2,648,553 | Ulrich | Aug. 11, 1953 |
| 2,660,456 | Meddock | Nov. 24, 1953 |